United States Patent [19]

Nakamura et al.

[11] Patent Number: 4,784,913
[45] Date of Patent: Nov. 15, 1988

[54] MAGNETIC RECORDING MEDIUM

[75] Inventors: Katsuya Nakamura; Eitaro Nakamura, both of Tokyo; Makoto Yamamoto, Hiratsuka, all of Japan

[73] Assignee: Nippon Zeon Co., Ltd., Tokyo, Japan

[21] Appl. No.: 117,588

[22] Filed: Nov. 6, 1987

[30] Foreign Application Priority Data

Nov. 10, 1986 [JP] Japan .................................. 61-266831

[51] Int. Cl.$^4$ ............................................. G11B 5/702
[52] U.S. Cl. ............................ 428/411.1; 252/62.54; 427/128; 428/413; 428/522; 428/694; 428/695; 428/900
[58] Field of Search ............... 428/694, 413, 416, 418, 428/695, 900, 522, 523; 427/128, 131, 411.1; 252/62.54

[56] References Cited

U.S. PATENT DOCUMENTS

| 4,004,997 | 1/1977 | Tsukamoto | 428/329 |
|---|---|---|---|
| 4,368,237 | 1/1983 | Yamada | 428/900 |
| 4,415,630 | 11/1983 | Kubota | 427/128 |
| 4,562,117 | 12/1985 | Kikukawa | 428/407 |
| 4,594,174 | 6/1986 | Nakayama | 428/694 |
| 4,600,521 | 7/1986 | Nakamura | 428/329 |
| 4,707,410 | 11/1987 | Nata | 428/413 |
| 4,707,411 | 11/1987 | Nakayama | 428/413 |
| 4,734,330 | 3/1988 | Oiyama | 428/411.1 |

FOREIGN PATENT DOCUMENTS

| 3622070 | 1/1987 | Fed. Rep. of Germany . |
|---|---|---|
| 103127 | 6/1982 | Japan . |
| 175024 | 10/1984 | Japan . |
| 008329 | 1/1987 | Japan . |

*Primary Examiner*—Ellis P. Robinson
*Attorney, Agent, or Firm*—Armstrong, Nikaido, Marmelstein & Kubovcik

[57] ABSTRACT

A magnetic recording medium is disclosed, which comprises a base and a magnetic layer formed on at least one surface of the base and the magnetic layer comprises a magnetic powder and a binder which comprises a vinyl chloride resin having both epoxy and quaternary ammonium salt groups.

13 Claims, No Drawings

MAGNETIC RECORDING MEDIUM

BACKGROUND OF THE INVENTION

The present invention relates to a magnetic recording medium. In particular, the present invention relates to a magnetic recording medium having excellent thermal stability and durability in which a magnetic powder is well dispersed in a binder.

Magnetic recording media such as magnetic tapes and magnetic cards are prepared usually by applying a magnetic paint comprising a magnetic powder and a binder for the powder to a base such as a polyester film to form a magnetic layer. Recently, a finely divided magnetic powder having a large specific surface area is used in order to increase the coercivity, maximum amount of saturation magnetization, S/N and magnetic rocording density.

However, when a vinyl chloride copolymer resin such as vinyl chloride/vinyl acetate/vinyl alcohol, vinyl chloride/vinyl acetate/maleic acid or vinyl chloride/vinyl acetate/maleic acid/vinyl alcohol copolymer resin is used as the binder for the finely divided magnetic powder in the preparation of the magnetic paint, problems such as an increase in the viscosity of the paint and insufficient dispersion of the finely divided magnetic powder in the binder are posed.

Under these circumstances, a surfactant having a low molecular weight was used as a dispersant for improving the dispersibility of the finely divided magnetic powder. However, the amount of the dispersant is limited, since when it is used in a large amount, the durability of the magnetic recording medium is reduced and a magnetic head (hereinafter referred to merely as the "head") is stained. Thus, it has been difficult to sufficiently improve the dispersibility of the finely divided magnetic powder.

For improving the dispersibility of the magnetic powder, a process wherein a high shear force is applied thereto in the dispersion step is employed.

However, in this process, the viscosity of the paint is increased and the temperature is elevated to thermally decompose the vinyl chloride copolymer resin. Gaseous hydrogen chloride formed by the thermal decomposition deteriorates the magnetic powder to reduce the durability of the magnetic recording medium to thereby affect the reliability.

Further, it was proposed to introduce an amine-modified vinyl unit into the vinyl chloride/vinyl acetate/vinyl alcohol copolymer resin usually used as the binder so that the binder per se will acquire a dispersing power (see Japanese Patent Application Kokai Publication No. 61-172213).

However, this process has a defect that since the thermal stability of the vinyl chloride copolymer resin per se is seriously reduced by the modification with the amine, the reliabilities of the magnetic recording medium and the head are reduced.

A process for preventing the thermal decomposition of the vinyl chloride copolymer resins by adding a stabilizer for vinyl chloride resins, such as an organotin compound, e.g. dibutyltin laurate or dibutyltin maleate, to the resins has been known.

However, the organotin compounds act as catalysts for the crosslinking reaction of the isocyanate compound usually added to the binder and, therefore, the pot life of the magnetic paint is extremely reduced, the stability of the magnetic paint is deteriorated and the viscosity of the paint is extremely increased in the course of coating to reduce the dispersibility of the magnetic powder and the surface smoothness of the magnetic layer.

In addition, a process wherein the magnetic coating film is crosslinked with electron beams so as to prepare a magnetic recording medium having an excellent durability and free of the problem of a shortened pot life was proposed. However, no intended magnetic recording medium can be obtained because the binder and the additives not always exhibit sufficient performances.

SUMMARY OF THE INVENTION

An object of the present invention is to overcome the defects of the ordinary magnetic recording media.

Namely, an object of the present invention is to provide a magnetic recording medium having excellent heat stability and reliability and a high magnetic recording density by thoroughly dispersing a finely divided magnetic powder in a binder without using any dispersant.

The object of the present invention is attained by using a magnetic recording medium comprising a base and magnetic layer(s) formed on the base, wherein the magnetic layer comprises a magnetic powder and a binder which is a vinyl chloride resin having both epoxy and quaternary ammonium salt groups.

DESCRIPTION OF THE PREFERRED EMBODIMENTS

The vinyl chloride resin having both epoxy and quaternary ammonium salt groups can be prepared by either of the following processes 1 and 2.

Process 1

This process comprises copolymerizing vinyl chloride, a radical-polymerizable monomer having an epoxy group and copolymerizable with vinyl chloride and a radical-polymerizable monomer having a quaternary ammonium salt group copolymerizable with vinyl chloride in the presence of a free-radical generator.

If necessary, another monomer copolymerizable with these monomers can also be used as the comonomer.

The radical-polymerizable monomers having an epoxy group include, for example, glycidyl ethers of unsaturated alcohols, such as allyl glycidyl ether and methallyl glycidyl ether; glycidyl esters of unsaturated carboxylic acids, such as glycidyl acrylate, glycidyl methacrylate, glycidyl p-vinylbenzoate, methyl glycidyl itaconate, glycidyl ethyl maleate, glycidyl vinylsulfonate and glycidyl (meth)allylsulfonate; and epoxy olefins such as butadiene monoxide, vinylcyclohexene monoxide and 2-methyl-5,6-epoxyhexene. Among them, non-conjugated monomers such as glycidyl ethers of unsaturated alcohols and epoxy olefins are preferably used from the viewpoint of the heat stability.

The radical-polymerizable monomers having a quaternary ammonium salt group include, for example, diallyldimethylammonium chloride, diallyldimethylammonium stearate, vinylbenzyltrimethylammonium chloride, (meth)acryloyloxyethyltrimethylammonium chloride, (meth)acryloyloxypropyldimethylbenzylammonium chloride and dimethylaminopropyl(meth)acrylamidotrimethylammonium chloride.

The free-radical generators usable in the present invention include azo compounds such as azodicarbonamides; organic peroxides such as lauroyl peroxide; and persulfates such as potassium, sodium and ammonium persulfates.

Examples of the monomers usable, if necessary, as the comonomers include vinyl carboxylates such as vinyl acetate and vinyl propionate; vinyl ethers such as methyl vinyl ether, isobutyl vinyl ether and cetyl vinyl ether; vinylidene halides such as vinylidene chloride and vinylidene fluoride; unsaturated carboxylic esters such as diethyl maleate, butyl benzyl maleate, dimethyl itaconate, methyl (meth)acrylate, ethyl (meth)acrylate, 2-hydroxyethyl (meth)acrylate and lauryl (meth)acrylate; olefins such as ethylene and propylene; unsaturated alcohols such as allyl alcohol, 3-buten-1-ol and 5-hexen-1-ol; unsaturated nitriles such as (meth)acrylonitrile; and aromatic vinyl compounds such as styrene, α-methylstyrene and p-methylstyrene.

These monomers used as other comonomers are selected suitably for improving the solubilities of the resin used in the present invention and another resin when they are mixed together while controlling the compatibility of them with each other and the softening point thereof and also for improving the characteristics of the coating film and facilitating the coating.

The vinyl chloride resin used in the present invention can be prepared by any of known polymerization processes according the above-mentioned process 1. It is preferred, however, to employ a solution polymerization process, an emulsion polymerization process or a suspension polymerization process wherein a lower alcohol such as methanol or ethanol is used alone or in combination with deionized water.

Process 2

This process comprises adding a tertiary amine compound in the presence or absence of an acid to (1) an epoxy group-containing vinyl chloride resin prepared by copolymerizing vinyl chloride, a monomer having an epoxy group and, if necessary, another monomer copolymerizable with them in the presence of a free-radical generator or (2) an epoxy group-containing vinyl chloride resin prepared by partially dehydrochlorinating polyvinyl chloride, a copolymer resin comprising vinyl chloride as the main component and another monomer copolymerizable with vinyl chloride or a chlorinated polyvinyl chloride resin prepared by adding chlorine to the polyvinyl chloride resin or the copolymer resin mainly comprising vinyl chloride by heating or contact with a dehydrochlorinating agent and then epoxidizing the dehydrochlorination product with an epoxidizing agent such as a percarboxylic acid.

The monomers having an epoxy group and other monomers copolymerizable with this monomer and used, if necessary, are the same as those mentioned above with reference to the process 1.

The dehydrochlorinating agents include basic compounds such as alkali hydroxides and amines and the percarboxylic acids include peracetic acid and perbenzoic acid.

The tertiary amines used in the process 2 include saturated tertiary amines such as pyridine, dimethyllaurylamine, dimethylstearylamine, triethylamine and diethylmethoxyethylamine; and unsaturated tertiary amines such as diethylaminoethyl (meth)acrylate and dimethylaminopropyl(meth)acrylamide.

The acids used in the addition of the amine include saturated acids such as acetic, lactic and chloroacetic acids; and unsaturated acids such as (meth)acrylic and crotonic acids.

Supposedly the reaction of the tertiary amine with the vinyl chloride resin having an epoxy group in the process 2 is mainly an addition reaction of the tertiary amine to the epoxy ring to form an ammonium cation, since the conversion is extremely reduced as the amount of the epoxy group in the vinyl chloride resin is reduced.

Namely, to obtain the vinyl chloride resin usable in the process (2) according to the present invention, the vinyl chloride resin having at least 1 wt. % of epoxy group is necessitated from the viewpoint of the reactivity with the tertiary amine.

The reaction of the epoxy group-containing vinyl chloride resin with the tertiary amine can be conducted either in a solvent in which both of them are soluble or by directly melt-mixing them. When the reaction is conducted at a high temperature, it must be completed within a short period of time so as to inhibit side reactions. When the reaction is conducted in a solvent, a relatively mild temperature condition of about 40° to 60° C. is preferred.

When an unsaturated amine and an unsaturated acid are used as the tertiary amine and the acid, respectively, in the preparation of the vinyl chloride resin having both epoxy and quaternary ammonium salt groups used in the present invention by process 2, the coating film prepared can be crosslinked and cured by irradiation with electron beams. In this case, an electron beam-curable resin, oligomer or monomer having at least one unsaturated bond in the molecule can also be used.

The vinyl chloride resin having both epoxy and quaternary ammonium salt groups prepared by the above-mentioned process 1 or 2 has an epoxy group content of preferably 0.5 to 15 wt. % or more. When this content is less than 0.5 wt. %, no excellent thermal stability can be exhibited. The quaternary ammonium salt group content of the vinyl chloride resin is preferably in the range of 0.05 to 0.5 wt. % (in terms of a nitrogen atom of the salt group) based on the vinyl chloride resin. When it is less than 0.05 wt. %, the dispersibility of the magnetic powder is insufficient, while when it exceeds 0.5 wt. %, the magnetic paint gels easily to increase its viscosity and, in addition, the coating film formed therefrom will have a high hygroscopicity.

The vinyl chloride content of the resin is 60 to 95 wt. %. When it is less than 60 wt. %, the compatibility of the resin with a flexible material is reduced and the solvent release of the coating film is reduced seriously unfavorably.

As for the molecular weight of the vinyl chloride resin, its average degree of polymerization is 100 to 900, preferably 200 to 500. When the degree of polymerization is less than 100, the durability of the magnetic layer is insufficient, while when it exceeds 900, the viscosity of the paint becomes too high to attain sufficient dispersion of the magnetic powder.

A flexible resin such as known polyurethane resin, polyester resin or acrylonitrile/butadiene copolymer resin can be used for the purpose of improving the adhesion or imparting the durability, besides the vinyl chloride resin having both epoxy and quaternary ammonium salt groups used as the binder in the present invention. Such a flexible resin may contain an epoxy group or a functional group such as $-COOM$, $-SO_3M$, $-SO_4M$, $-PO_3M_2$ or $PO_4M_2$ (M being hydrogen, alkali metal or amnonium) so as to improve the dispersibility of the magnetic powder.

When the flexible resin is used, its amount is 0.1 to 2.0 parts by weight per part by weight of the vinyl chloride resin used in the present invention.

The magnetic powders usable in the present invention include powdery Fe, Co, Fe alloys, Co-containing $\gamma$-$Fe_2O_3$, Co-containing $Fe_3O_4$, $\gamma Fe_2O_3$, $Fe_3O_4$, barium ferrite and mixture of them.

The amount of the magnetic powder can be suitably determined in the range as is usual in ordinary magnetic recording media.

If necessary, ordinary additives such as a lubricant, dispersant, antistatic agent and abrasive; and ordinary resins for magnetic paints such as phenoxy, cellulosic, amino, butyral and acrylic resins can be used so far as the object of the present invention is not affected. Further, an ordinarily used polyisocyanate compound can be added in an ordinary amount in order to form a crosslinkage according to the isocyanate reaction.

The magnetic recording medium of the present invention can be prepared by preparing the magnetic paint, applying the paint to a base such as a polyester film by spraying or roll coating in an ordinary manner and drying it to form a magnetic layer.

The magnetic paint can be prepared by suitably mixing the above-mentioned vinyl chloride resin having both epoxy and quaternary ammonium salt groups, the magnetic powder and, if necessary, the above-mentioned components.

As described above, a magnetic recording medium having excellent heat stability, dispersibility and durability can be prepared according to the present invention wherein the vinyl chloride resin having both epoxy and quaternary ammonium salt groups is used as the binder.

In particular, when a high shear force is applied in order to disperse the magnetic powder in the binder, hydrogen chloride formed by the thermal decomposition of the vinyl chloride resin can be captured by the epoxy group in the molecular chain to prevent the chain decomposition reaction and also to improve the heat stability.

As the heat stability is improved as described above, the dispersibility of the magnetic powder can be sufficiently increased and the magnetic powder can be prevented from being deteriorated. Accordingly, the durability of the magnetic recording medium can be improved.

The effects of the present invention can be obtained also by adding the epoxy group-containing compound to a known binder. However, the use of a known compound such as a low molecular compound, e.g. epoxidized soybean oil, causes problems such that the head is stained by bleeding of the magnetic powder on the surface of the magnetic layer and that the traveling property of the tape is affected by an increase in the tackiness of the magnetic layer.

According to the present invention, however, such defects caused by the addition of the epoxy group-containing compounds to the binder can also be overcome.

The following examples, comparative examples and referential examples will further illustrate the present invention, wherein all the parts and percentages are by weight, unless otherwise stated.

EXAMPLE 1

Preparation of vinyl chloride resin having both epoxy and quaternary ammonium salt groups (process 1):

Vinyl chloride, allyl glycidyl ether, diallyldimethylammonium chloride and vinyl acetate were emulsion-polymerized in the presence of cumene hydroperoxide/sodium formaldehyde sulfoxylate to obtain a liquid polymerization product, which was frozen, thawed, washed and dried to obtain a vinyl chloride resin (A) containing 1.5% of an epoxy group, 0.15% of nitrogen and 87% of vinyl chloride.

EXAMPLE 2

Preparation of vinyl chloride resin having both epoxy and quaternary ammonium salt groups (process 2):

Allyl glycidyl ether was emulsion-polymerized with vinyl chloride in the presence of potassium persulfate to obtain a vinyl chloride copolymer (a) having an epoxy group content of 3.5% and a vinyl chloride content of 88%. 100 parts of the copolymer (a), 1.5 parts of pyridine and 1.5 parts of acetic acid were dissolved in 250 parts of methyl ethyl ketone and the reaction was conducted at 60° C. for 24 h. The reaction mixture was thrown into 1,000 parts of methanol and the reaction product thus precipitated was recovered. The reaction product was dissolved in 300 parts of tetrahydrofuran. The solution was thrown into 1,000 parts of water and a resin thus precipitated was washed with water and dried to obtain a resin (B).

EXAMPLE 3 AND COMPARATIVE EXAMPLE 1

Preparation of vinyl chloride resin having both epoxy and quaternary ammonium salt groups (process 2):

Vinylcyclohexene monoxide, vinyl chloride and vinyl acetate were suspension-polymerized in the presence of 2,2'-azobisisobutyronitrile to obtain a vinyl chloride copolymer (b) comprising 3% of an epoxy group, 5% of vinyl acetate and 87% of vinyl chloride (Comparative Example 1). 100 parts of the copolymer (b) was melt-mixed with 2.0 parts of dimethyllaurylamine on a mixing roll at 120° C. for 10 min. The mixture was dissolved in 300 parts of tetrahydrofuran. The solution was poured into 1,000 parts of methanol to precipitate a resin, which was recovered and purified by precipitating it again from tetrahydrofuran/methanol to obtain a purified resin (C).

EXAMPLE 4

Preparation of vinyl chloride resin having both epoxy and quaternary ammonium salt groups (process 2):

100 parts of the copolymer (b) prepared in Example 3, 2 parts of diethylaminoethyl methacrylate, 5 parts of methacrylic acid and 1 part of cyclohexene were dissolved in tetrahydrofuran and the reaction was conducted at 60° C. for 24 h. The reaction mixture was thrown into 1,000 parts of methanol and a resin thus precipitated was recovered and dried to obtain a resin (D).

COMPARATIVE EXAMPLES 2 AND 3

The same procedure as that of Example 2 was repeated except that the vinyl chloride copolymer (a) was replaced with vinyl chloridevinyl acetatevinyl alcohol copolymer (comprising 91% of vinyl chloride, 3% of vinyl acetate and 6% of vinyl alcohol) (c) (Comparative Example 2) to obtain a resin (E) (Comparative Example 3).

EXAMPLE 5

The vinyl chloride resins prepared in Examples 1 to 4 and Comparative Examples 1 to 3 were subjected to the following tests:

(Heat stability test)

1 g of the vinyl chloride resin shown in the following Table and 1 g of a polyurethane resin (Nippolane 2304; a product of Nippon Polyurethane Kogyo Co., Ltd.) were dissolved in tetrahydrofuran. 0.4 g of a polyisocyanate (Coronate L; a product of Nippon Polyurethane Kogyo Co., Ltd.) was added to the solution. A coating film was prepared from the solution by means of a doctor blade and the solvent was evaporated therefrom to form a cast film. 1 g of the cast film was placed in a 15-cc test tube, which was stopped with an absorbent cotton in which a Congo Red test paper was interposed. The test tube was placed in an oil bath at 150° C. and the time taken for a color change of the Congo Red test paper by hydrochloric acid formed was measured to evaluate the heat stability.

(Gloss test)

A mixture of 400 parts of cobalt-coated magnetic iron oxide powder, 70 parts of a vinyl chloride resin shown in the following Table, 30 parts of the same polyurethane resin as that used in the heat stability test (except that in Experiment No. 4, Nippolane 2304 was replaced with Aronix M-1100 of Toa Gosei Chemical Industry Co., Ltd.), 300 parts of methyl ethyl ketone, 300 parts of methyl isobutyl ketone and 300 parts of toluene was sheared at a high speed for 90 min to obtain a dispersion. 20 parts of the same polyisocyanate as that used in the heat stability test was added thereto and mixed for 10 min to obtain a dispersion to be used as a magnetic paint. In Experiment No. 4, however, no polyisocyanate was used.

The magnetic paint thus prepared was applied to a polyester film to form a coating film having a thickness of 5 μm. This product was subjected to a magnetic orientation treatment and then dried. The reflectivity of the magnetic coating film at an angle of incidence and reflection of 60° was measured with a glossmeter. The larger the value, the better the dispersibility of the magnetic powder.

(Durability test)

The magnetic coating film used in the gloss test was smoothed with a calender roll and then crosslinked and aged in a thermostat at 65° C. for 40 h. However, in case the polyurethane resin containing Aronix M-1100 was used while no polyisocyanate was used (Experiment No. 4), the coating film was irradiated with electron beams of 10 megarad by using an electron beam accelerator in place of aging by heating in the thermostat.

The magnetic coating film was brought into contact with a rotating drum having a diameter of 40 mm to which an abrasive paper had been applied under a load of 100 g. After the rotation at 150 rpm for a given time, the degree of staining of the abrasive paper was examined on the basis of the following criteria:

o: no stain
Δ: slight stain
x: severe stain.

The test results are shown in the following Table.

TABLE

| | | Vinyl chloride resin | | | | Heat stability (min) | Gloss (%) | Durability |
|---|---|---|---|---|---|---|---|---|
| No. | Designation | Vinyl chloride (%) | Epoxy group (%) | Nitrogen (%) | Average degree of Polymerization | | | |
| Ex. | | | | | | | | |
| 1 | A | 87 | 1.5 | 0.15 | 420 | 15 | 86 | o |
| 2 | B | 89 | 2.1 | 0.22 | 310 | 10 | 98 | o |
| 3 | C | 87 | 1.8 | 0.10 | 340 | 7 | 96 | o |
| 4 | D | 86 | 0.9 | 0.14 | 340 | 5 | 108 | o |
| Comp. Ex. | | | | | | | | |
| 1 | b | 87 | 3.0 | — | 320 | 40 | 39 | x |
| 2 | c | 91 | — | — | 430 | 3 | 50 | Δ |
| 3 | E | 91 | — | — | 430 | 1 | 52 | Δ |

We claim:

1. A magnetic recording medium comprising a base and a magnetic layer formed on at least one surface of said base, said magnetic layer comprising a magnetic powder and a binder, said binder being an adduct of a tertiary amine compound with a vinyl chloride copolymer containing an epoxy group, said adduct having an average degree of polymerization of 100 to 900, an epoxy group content of at least 0.5 wt. %, a quaternary ammonium group content of 0.05 to 0.5 wt. % in terms of the amount of nitrogen atoms in the ammonium group, and a vinyl chloride content of at least 60 wt. %.

2. A magnetic recording medium according to claim 1, wherein said vinyl chloride copolymer is a copolymer prepared by copolymerizing vinyl chloride with a monomer having an epoxy group.

3. A magnetic recording medium according to claim 2, wherein said monomer having an epoxy group is a compound selected from the group consisting of glycidyl ethers of unsaturated alcohols, glycidyl esters of unsaturated carboxylic acids and epoxy olefins.

4. A magnetic recording medium according to claim 1, wherein said tertiary amine compound is a saturated or unsaturated tertiary amine.

5. A magnetic recording medium according to claim 2, wherein said copolymer of vinyl chloride with a monomer having an epoxy group further contains another comonomer component.

6. A magnetic recording medium according to claim 5, wherein said another comonomer component is a vinyl compound selected from the group consisting of vinyl carboxylates, vinyl ethers, vinylidene halides, unsaturated carboxylic esters, olefins, unsaturated alcohols, unsaturated nitriles and aromatic vinyl compounds.

7. A magnetic recording medium according to claim 1, wherein said magnetic powder is at least one member selected from the group consisting of Fe, Co, Fe alloys, Co-containing $\gamma$-Fe$_2$O$_3$, Co-containing Fe$_3$O$_4$, $\gamma$-Fe$_2$O$_3$, Fe$_3$O$_4$, barium ferrite and mixtures of them.

8. A magnetic recording medium comprising a base and a magnetic layer formed on at least one surface of said base, said magnetic layer comprising a magnetic powder and a binder, said binder being a radical copolymer of vinyl chloride, a radical-polymerizable monomer having an epoxy group copolymerizable with the vinyl chloride and a radical-polymerizable monomer having a quaternary ammonium group polymerizable with the vinyl chloride, said radical copolymer having an average degree of polymerization of 100 to 900, an epoxy group content of at least 0.5 wt. %, an ammonium group content of 0.05 to 0.5 wt. % in terms of the amount of nitrogen atoms in the ammonium group, and a vinyl chloride content of at least 60 wt. %.

9. A magnetic recording medium according to claim 8, wherein said radical-polymerizable monomer having an epoxy group is a compound selected from the group consisting of glycidyl ethers of unsaturated alcohols, glycidyl esters of unsaturated carboxylic acids and epoxy olefins.

10. A magnetic recording medium according to claim 8, wherein said radical-polymerizable monomer having a quaternary ammonium salt group is a compound selected from the group consisting of diallyldimethylammonium chloride, diallyldimethylammonium stearate, vinylbenzyltrimethylammonium chloride, (meth)acryloyloxyethyltrimethylammonium chloride, (meth)acryloyloxypropyldimethylbenzyl ammonium chloride and dimethylaminopropyl(meth)acrylamidotrimethylammonium chloride.

11. A magnetic recording medium according to claim 8, wherein said copolymer further contains another monomer as a copolymerizable component.

12. A magnetic recording medium according to claim 11, wherein said another copolymerizable component is a vinyl compound selected from the group consisting of vinyl carboxylates, vinyl ethers, vinylidene halides, unsaturated carboxylic esters, olefins, unsaturated alcohols, unsaturated nitriles and aromatic vinyl compounds.

13. A magnetic recording medium according to claim 8, wherein said magnetic powder is at least one member selected from the group consisting of Fe, Co, Fe alloys, Co-containing $\gamma$-Fe$_2$O$_3$, Co-containing Fe$_3$O$_4$, $\gamma$-Fe$_2$O$_3$, Fe$_3$O$_4$, barium ferrite and mixtures of them.

* * * * *